United States Patent [19]

Huether et al.

[11] Patent Number: 4,818,176

[45] Date of Patent: Apr. 4, 1989

[54] BURST GUARD RING FOR TURBO-ENGINE HOUSINGS

[75] Inventors: Werner Huether; Axel Rossmann, both of Karlsfeld, Fed. Rep. of Germany

[73] Assignee: MTU Motoren-und Turbinen-Union Muenchen GmbH, Munich, Fed. Rep. of Germany

[21] Appl. No.: 178,481

[22] Filed: Apr. 7, 1988

[30] Foreign Application Priority Data

Apr. 15, 1987 [DE] Fed. Rep. of Germany ....... 3712830
Apr. 15, 1987 [DE] Fed. Rep. of Germany ....... 3712829

[51] Int. Cl.⁴ .............................................. F01D 21/00
[52] U.S. Cl. .................................... 415/9; 415/219 R
[58] Field of Search ............... 415/9, 174, 121 G, 197, 415/219 R

[56] References Cited

U.S. PATENT DOCUMENTS

| 3,602,602 | 8/1971 | Motta | 415/9 |
| 4,244,994 | 1/1981 | Trainor et al. | 428/37 |
| 4,377,370 | 3/1983 | Porcelli | 415/9 |
| 4,411,589 | 10/1983 | Joubert et al. | 415/9 |
| 4,425,080 | 1/1984 | Stanton et al. | 415/9 X |
| 4,547,122 | 10/1985 | Leech | 415/9 |
| 4,718,818 | 1/1988 | Premont | 415/9 |

FOREIGN PATENT DOCUMENTS

| 2404939 | 8/1974 | Fed. Rep. of Germany . |
| 2950752 | 6/1980 | Fed. Rep. of Germany . |
| 3515835 | 12/1985 | Fed. Rep. of Germany . |
| 2514823 | 4/1983 | France . |
| 1260111 | 1/1972 | United Kingdom . |
| 2159886 | 12/1985 | United Kingdom ................... 415/9 |

Primary Examiner—Robert E. Garrett
Assistant Examiner—Joseph M. Pitko
Attorney, Agent, or Firm—W. G. Fasse; D. H. Kane, Jr.

[57] ABSTRACT

A burst guard ring for stopping and retaining blade fragments thrown from a failing rotor of a turbine engine includes an outer fiber belt of a highly elastic material, preferably aramid fibers in a silicone rubber matrix surrounding the engine housing. Ceramic tiles are provided radially inwardly of the fiber belt or in the fiber belt exclusively at certain critical locations where any bulging of the fiber ring due to blade fragment impact would damage auxiliary devices or pipelines arranged adjacent or close to the engine at such critical locations. In non-critical areas the fiber belt provides sufficient protection without the ceramic tiles. The high energy absorbing protective effect of elastic fibers is advantageously combined with the low straining or expansion of ceramic, so that a low total weight is achieved.

11 Claims, 1 Drawing Sheet

BURST GUARD RING FOR TURBO-ENGINE HOUSINGS

The invention relates to a burst guard ring for turbo-engine housings, including a ceramic layer surrounded externally by a belt of fiber material.

DESCRIPTION OF THE PRIOR ART

Such burst guard rings are generally used for externally surrounding or enclosing the rotor areas of the housings of turbine engines attached below the airfoils or wings of an aircraft. In the event of a fracture or failure of a rotor blade, the blade fragment bursts through or pierces the engine housing and then impacts against the ceramic layer of the burst guard ring. If the blade fragment has a sufficient kinetic energy, its impact causes the ceramic layer to shatter, whereby the energy is distributed among many ceramic chips. The distributed energy is then absorbed by the fiber belt which surrounds the ceramic layer, where the blade fragments are stopped and held.

The above arrangement has the serious disadvantage of a relatively high weight. The high weight is a result of the density of the materials used, as well as of the amount of materials used to provide complete circumferential coverage. The great weight of the prior burst guard rings causes a reduction in performance and fuel efficiency, especially in today's lighter and more efficient aircraft and engines.

OBJECTS OF THE INVENTION

In view of the foregoing it is the aim of the invention to achieve the following objects singly or in combination:

to reduce the weight of a burst guard ring of the above described type, while providing equivalent or superior rotor blade burst protection compared to conventional guard rings;

to locate a fiber belt and ceramic tiles in critical areas requiring special protection and to provide the fiber belt in non-critical areas of the guard ring to achieve a sufficient blade fragment retaining capability in both areas;

to use modular ceramic tiles to form the ceramic layer only in critical areas inside the fiber belt; and to use materials which have a lower density with the same or greater energy absorbing capacity than the materials of conventional guard rings.

SUMMARY OF THE INVENTION

The above objects have been achieved in a burst guard ring for turbine engines according to the invention, in which the ceramic layer comprises separate ceramic tiles which are arranged only in a few preferred or critical areas of the circumference of the burst guard ring. Furthermore, the external fiber belt is made of a resilient or highly elastic fiber material, which is preferably an aramid fiber material.

As compared to glass fiber materials, aramid fibers are characterized by a significantly lower weight relative to the energy absorbing capacity. Thus, aramid fibers are well suited to be used as a fiber material for a burst guard ring. Because of its superior energy absorbing capacity in most cases the aramid fiber material alone will be able to stop and retain a blade fragment which has burst from the rotor. However, the impact of the blade fragment will often cause a considerable inter-fiber expansion and outward bulging of the fiber belt. In non-critical areas of the engine housing, where expansion or bulging of the burst guard ring is allowable, blade fragments ejected from a bursting rotor are effectively stopped through the deformation of the fiber material forming the fiber belt. Because of the considerable bulging of the fiber belt, many fibers are involved in the energy transfer and dissipation process.

While the retention of blade fragments in this manner may be sufficient in most non-critical areas, the protection may be insufficient in certain critical areas, where, for example, important pipes or conduits, or auxiliary devices are mounted close to the engine housing because of structural considerations. In these critical areas, an expansion or bulging of the fiber belt itself could already cause damage to nearby components, even when the blade fragment is successfully stopped and retained. Thus, according to the invention, ceramic tiles are arranged radially inwardly of the fiber belt in the critical areas where an expansion or bulging of the fiber belt is not allowable.

If a blade fragment from a failed rotor pierces the engine housing in a critical area covered by ceramic tiles, it then impacts on a ceramic tile. In the impact, practically the entire kinetic energy of the blade fragment is absorbed through the at least local shattering of the ceramic tile. Thus, the outer fiber belt practically only has to hold the ceramic chips and splinters together. Essentially, the present teaching prevents an unpermissable expansion or bulging of the fiber belt of the burst guard ring in the areas additionally protected by ceramic tiles. The thickness of the ceramic tiles is chosen according to the specific properties of the ceramic material being used and the expected maximum energy of the blade fragments. Preferably, the tile thickness is between 5 and 20 mm. Standard sized tiles may be produced, and then critical areas in different specific applications may be protected by arranging an appropriate number of pre-made standard tiles side by side. The gaps between adjacent tiles are small enough so that they have no detrimental effect on the tile layer's blade fragment stopping capability.

In different example embodiments, the material used for the ceramic tiles is boron nitrite, boron carbide, silicon carbide, aluminum oxide, or silicon nitrite.

Preferably, the aramid fibers are embedded in a highly elastic matrix material, for example silicon rubber, to form the fiber belt. Thereby, a good cohesion of the fiber layers is achieved, without reducing the energy absorbing capacity by stiffening the fiber belt.

The entire arrangement of the burst guard ring according to the invention is characterized by a significant saving or reduction in weight, because aramid fibers have only about half the density of glass fibers with the same energy absorbing capacity, and because the relatively heavy ceramic tiles are provided only at necessary critical areas of the engine housing.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
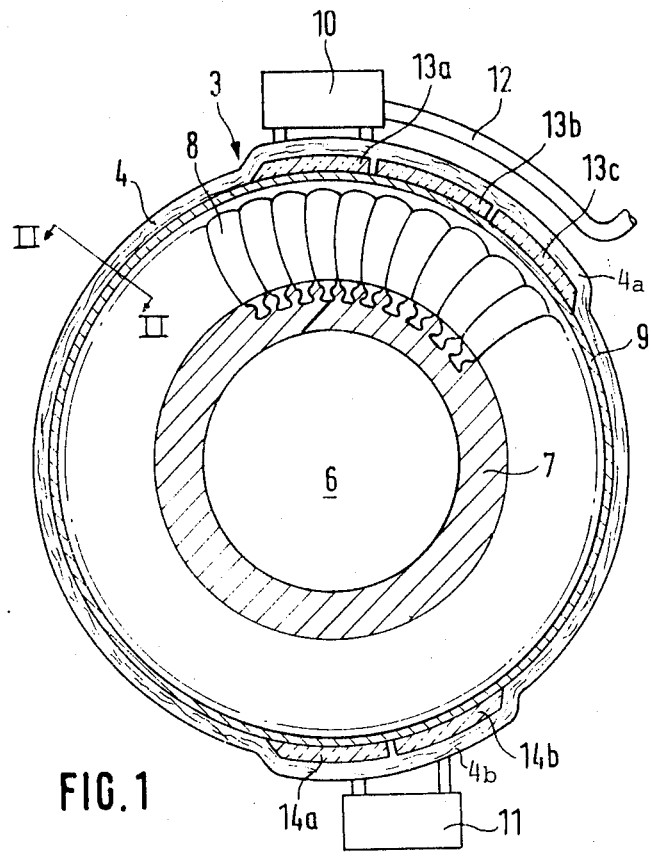
FIG. 1 is a schematic radial section through a turbine or turbo-engine with a burst guard ring according to the invention taken in the plane of a rotor.

FIG. 1 shows a turbine engine 6, having a rotor 7 with blades 8 distributed around its circumference, whereby only some of the blades 8 are shown. An engine housing 9 surrounds the rotor 7 slightly radially outwardly of the blades 8 to form a conventional gap between the blade tips and the inner housing surface. A burst guard ring 3 according to the invention surrounds the housing 9 and includes a multi-layered fiber belt 4 including suitable fibers embedded in a highly elastic matrix material. Auxiliary devices 10 and 11, and a pipeline 12, which are not described in detail, are arranged immediately adjacent or in close proximity to the engine housing 9 at locations defining critical locations. The devices 10 and 11, and the pipeline 12 may be adjustment mechanisms, drive elements, oil lines, or oil coolers, for example.

In the area radially inwardly of the critical location of the device 10 and the pipeline 12, ceramic tiles 13a, 13b, and 13c are arranged immediately radially outwardly of the housing 9 and radially inwardly or under the fiber belt portion 4a. Ceramic tiles 14a and 14b are similarly arranged in the area of the device 11 between the housing 9 and the belt portion 4b. The ceramic tiles are preferably made of boron nitrite, boron carbide, silicon carbide, aluminum oxide, or silicon nitrite.

Figure 2:
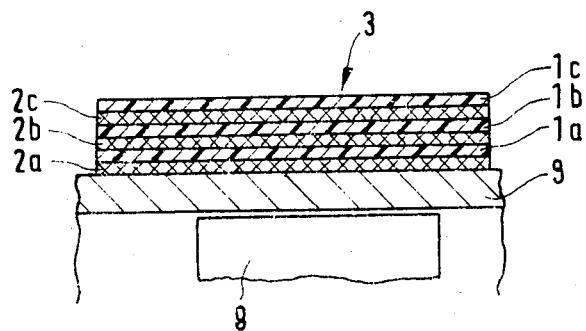
FIG. 2 is a partial lengthwise section along line II - II through the present burst guard ring as shown in FIG. 1.

FIG. 2 is a lengthwise partial section corresponding to the view II—II of FIG. 1, showing the engine housing 9 in an area near the plane of the rotor blades 8, which may, for example, be the blades of a fan, compressor, or turbine rotor of a turbine engine. The burst guard ring 3 comprising several fiber layers forming the belt 4 is arranged immediately radially outside the housing 9 in contact with the housing 9. Only a few of the fiber layers or plies are shown, in an enlarged view. Each second fiber layer 1a, 1b, c is saturated with a highly elastic matrix material such as silicone rubber. The alternating, nonsaturated fiber layers 2a, 2b, 2c are, however, partially impregnated by the matrix material in the finished lay-up so that a solid, form stable, yet highly elastic composite wrapping results. A cross-section through a critical area 4a, 4b would look similar to FIG. 2, except that the ceramic tiles 13a, 13b, 13c and 14a, 14b would be located between the housing 9 and the layers 1a . . . , 2a . . . , composite material, or even between such layers of fiber composite materials.

The fibers may be coated with a thin layer of epoxy-sizing to control the adhesion between the fibers and the matrix material.

Although the invention has been described with reference to specific example embodiments, it will be appreciated, that it is intended to cover all modifications and equivalents within the scope of the appended claims.

What we claim is:

1. A burst guard ring for a turbine engine housing, comprising radially outer elastic fiber belt means for surrounding said engine housing, said fiber belt means being made of fibers in a matrix material, and a partially radially inner circumferential ceramic layer comprising separate ceramic tile means arranged exclusively at least at one critical location extending over a limited portion of the circumference of said guard ring, said elastic fiber belt means holding said ceramic tile means in place only in said critical location, said elastic fiber belt means being free of ceramic tile means outside said critical location yet providing sufficient protection in noncritical areas outside said critical location.

2. The burst guard ring of claim 1, wherein said ceramic tile means is made of a material selected from the group including boron nitrile, boron carbide, silicon carbide, aluminum oxide, and silicon nitrite.

3. The burst guard ring of claim 1, wherein said ceramic tile means comprises a cross-section having a circular-segment arcuate shape.

4. The burst guard ring of claim 1, wherein said fiber material comprises aramid fibers.

5. The burst guard ring of claim 1, wherein said matrix material comprises a highly elastic matrix material.

6. The burst guard ring of claim 5, wherein said highly elastic matrix material comprises silicone rubber.

7. The burst guard ring of claim 1, wherein said fiber material is circumferentially wrapped to form a multilayered structure.

8. The burst guard ring of claim 7, wherein only every other layer of said fiber material is saturated with said matrix material.

9. The burst guard ring of claim 7, wherein an end of an outer layer of said fiber material is bonded to a next inner layer.

10. The burst guard ring of claim 1, wherein separate fibers of said fiber material comprise an adhesive coating for controlling the adhesion of said fibers with said matrix material.

11. A burst guard ring for a turbine engine housing, comprising radially outer elastic fiber belt means for surrounding said engine housing, said fiber belt means being made of fibers in a matrix material, and a partial radially inner circumferential ceramic layer comprising separate ceramic tile means arranged exclusively at least one critical location extending over a limited portion of the circumference of said guard ring, said elastic fiber belt means holding said ceramic tile means in place only in said critical location, said elastic fiber belt means being free of ceramic tile means outside said critical location yet providing sufficient protection in noncritical areas outside said critical location, and wherein only every other layer of said fiber material is saturated with said matrix material whereby fiber layers without matrix material are held between fiber layers in an elastic matrix.

* * * * *

UNITED STATES PATENT AND TRADEMARK OFFICE
CERTIFICATE OF CORRECTION

PATENT NO. : 4,818,176
DATED : April 4, 1989
INVENTOR(S) : Werner Huether, Axel Rossmann It is certified that error appears in the above-identified patent and that said Letters Patent is hereby corrected as shown below:

Column 2, line 44, replace "nitrite" by --nitride--;
         line 45, replace "nitrite" by --nitride--.

Column 3, line 28, replace "nitrite" by --nitride--;
         line 29, replace "nitrite" by --nitride--.

Claim 2, (Column 4, line 17), replace "nitrile" by --nitride--;
      (Column 4, line 18), replace "nitrite" by --nitride--.

Signed and Sealed this

Twenty-fourth Day of October, 1989

Attest:

DONALD J. QUIGG

Attesting Officer      Commissioner of Patents and Trademarks